Oct. 26, 1943.   D. H. BOSTWICK ET AL   2,332,888
FEED MECHANISM FOR SAWS
Filed Dec. 27, 1941   2 Sheets-Sheet 1

INVENTORS
D. H. Bostwick
F. Bode
BY Lieber & Lieber ATTORNEYS.

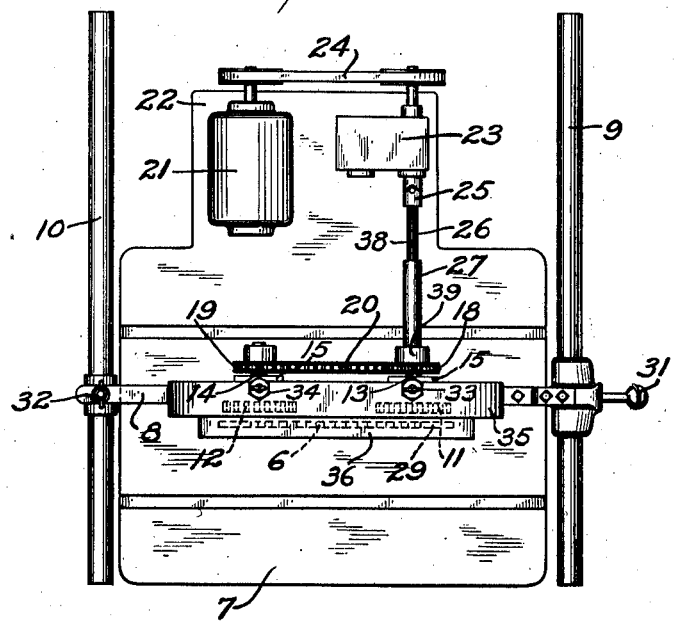
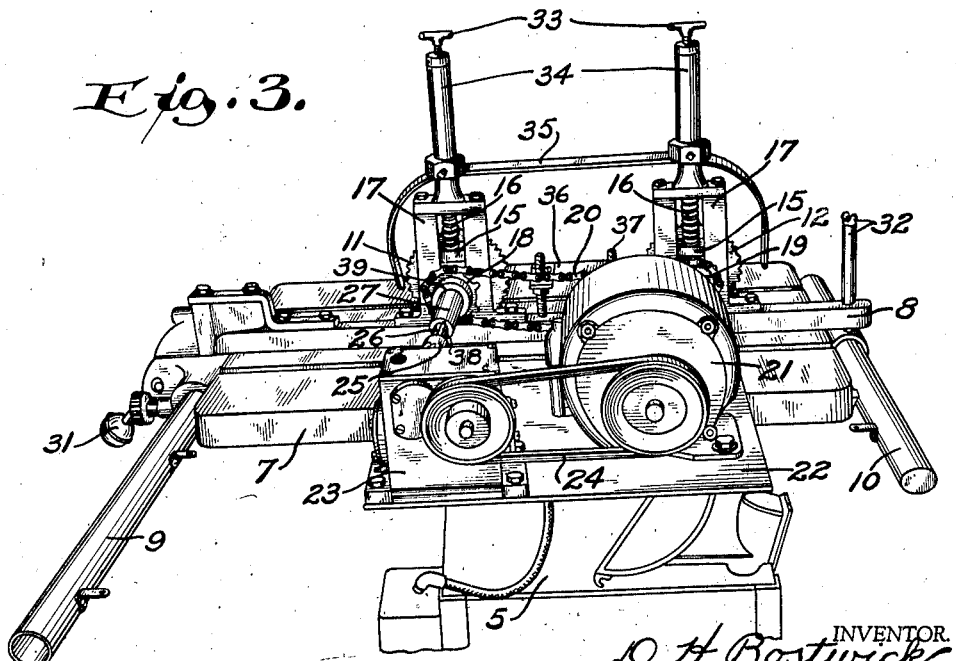

Patented Oct. 26, 1943

2,332,888

UNITED STATES PATENT OFFICE 2,332,888

FEED MECHANISM FOR SAWS

Douglas H. Bostwick and Theodore Bode, Port Washington, Wis., assignors to The Wisconsin Chair Company, Port Washington, Wis., a corporation of Wisconsin Application December 27, 1941, Serial No. 424,576

10 Claims. (Cl. 143—55)

The present invention relates generally to improvements in the art of transporting material to and from a working zone, and relates more specifically to various improvements in the construction and operation of mechanisms for feeding blocks or slabs of wood or the like toward and away from a cutter such as a circular saw.

An object of the invention is to provide an improved feed mechanism for saws, which is simple and compact in construction, and which is moreover highly flexible and efficient in use.

When operating circular rip saws in furniture factories or the like, it frequently becomes desirable to quickly and effectively sever slabs or elongated blocks of wood of diverse sizes and shapes into prismatic pieces having uniform transverse cross-section. It has long been customary to utilize a rapidly revolving circular rip saw associated with a vertically adjustable work supporting table, for this particular purpose; and when such a saw was employed, the table was initially set so that the saw would cut through successive pieces of diverse thickness and the pieces of work were ordinarily fed by hand along a normally fixed but adjustable guide resting on the table and past the saw blade. This procedure besides being relatively slow and tedious, was also extremely dangerous to the operator; and while previous attempts to provide a mechanical feed have been made, these have not been entirely satisfactory either because of involved complication, or because they would not properly and automatically adjust themselves to varying conditions of operation and use.

It is therefore a more specific object of our present invention to provide an improved feed mechanism especially applicable to circular rip saws revolvable about fixed axes and having work supporting tables which are adjustable to expose more or less of the saw blade to the cut, and which mechanism is adapted to rapidly and safely feed or transport successive blocks of diverse cross-sectional areas past the cutting zone.

Another object of this invention is to provide a simple mechanism for positively transporting successive blocks or slabs of wood or the like past a saw, which will automatically adjust itself so as to accommodate work pieces of different height or thickness.

A further object of the invention is to provide improved feed mechanism for rip saws, which can be quickly and conveniently adjusted to insure accurate cutting of successive pieces having predetermined dimensions, and which when set to produce pieces of a definite size will function to insure the production of a succession of blocks of uniform cross-sectional shape.

Still another object of our present invention is to provide an automatic feed device for rip saws or the like, which can be manufactured and sold at moderate cost, which may be conveniently applied to standard saw assemblages of various types, and which can be readily and safely manipulated to enhance the capacity of the saws.

These and other specific objects and advantages of the invention will be apparent from the following detailed description.

A clear conception of the various features which constitute our present invention, and of the mode of constructing and of operating saw feed mechanisms built in accordance with the improvement, may be had by referring to the drawings accompanying and forming a part of this specification wherein like reference characters designate the same or similar parts in the several views.

Fig. 3 is a rear perspective view of the saw and feed assembly; and

Fig. 4 is a top or plan view of the improved structure.

Figure 1:
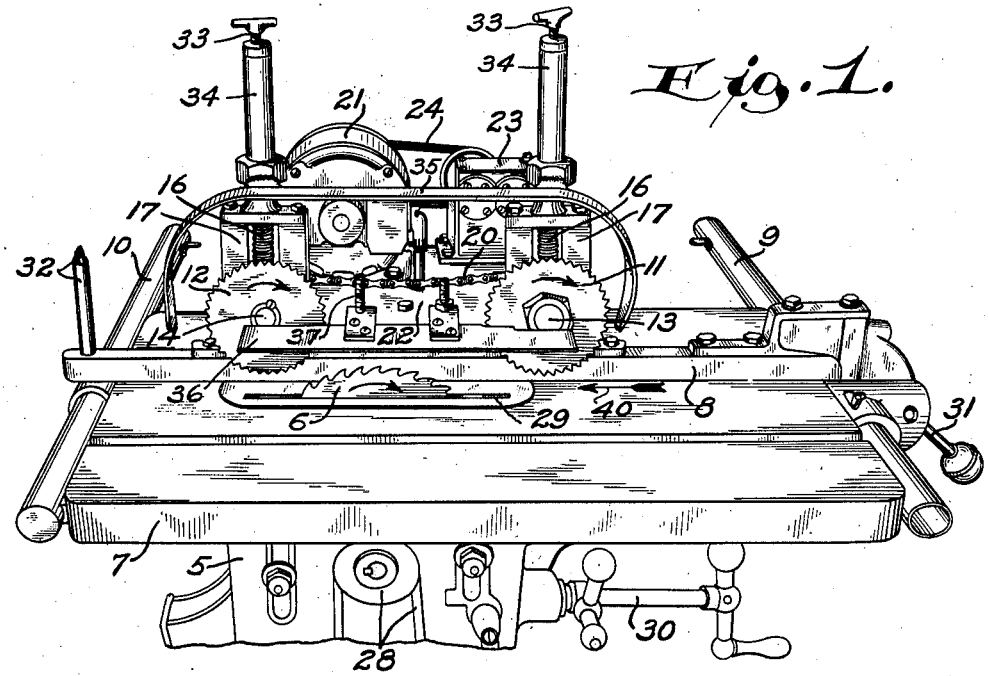
Fig. 1 is a front perspective view of a circular rip saw assemblage equipped with our improved feed mechanism.
Figure 2:
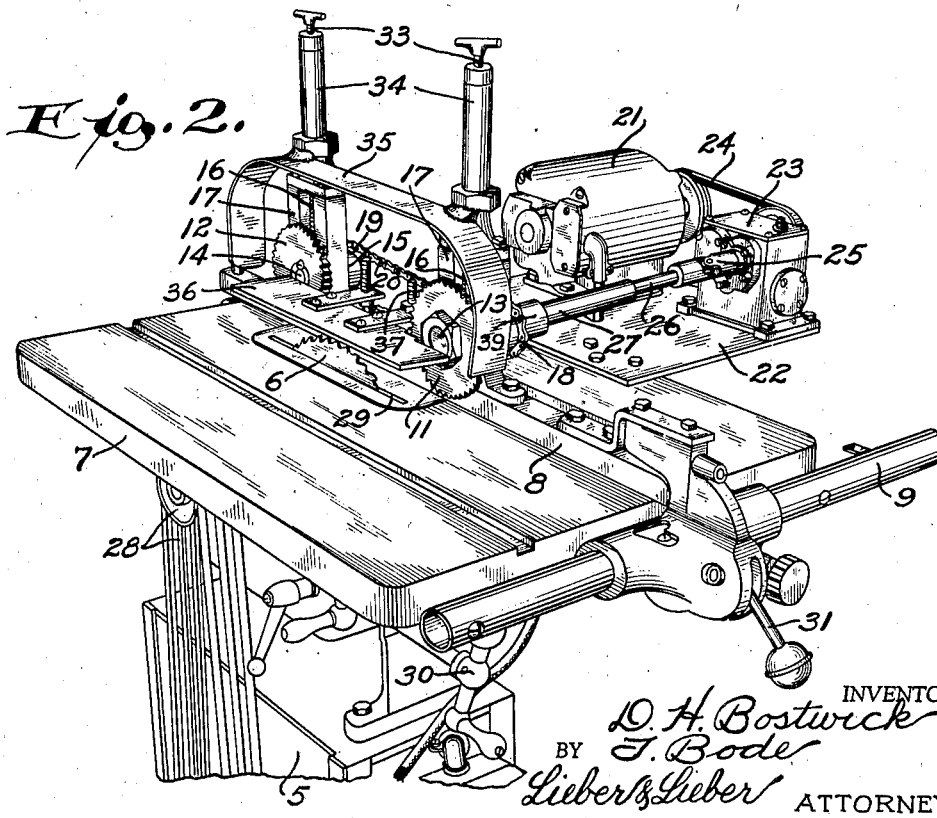
Fig. 2 is a front and side perspective view of the same assemblage.

While our invention has been illustrated and described herein as being especially adapted for application to and for co-operation with a circular wood saw of the type having a saw blade rotatable about a fixed horizontal axis and a vertically adjustable work supporting table co-acting with the saw, it is not our desire or intent to thereby unnecessarily restrict the scope or utility of the improvement.

Referring to the drawings, the improved saw and feed mechanism assemblage shown therein, comprises in general, a main support or frame 5; a circular saw blade 6 journalled for rotation in the frame 5 about a fixed horizontal axis; a work supporting table 7 mounted for vertical adjustment upon the frame 5 so as to expose more or less of the saw blade 6 to the cutting zone; an elongated work guide 8 extending across the table 7 and being adjustable toward and away from the plane of cutting of the blade 6 along parallel guide rods 9, 10 disposed on opposite sides of the table 7; a pair of spaced peripherally toothed work supply and discharge feed wheels 11, 12 respectively, carried by parallel shafts 13, 14 journalled in bearing blocks 15 which are vertically movable against the action of compression springs 16, and in guideways 17 secured to the guide 8; a pair of sprockets 18, 19 secured to the rear ends of the feed wheel shafts 13, 14 respectively, and being drivingly interconnected by a sprocket chain 20; an electric feed mechanism driving motor 21 mounted on an extension plate 22 secured to the rear of the table 7, and being drivingly connected with a speed reducing unit 23 carried by the same plate 22, by means of a belt drive 24; and a positive flexible drive connecting the supply feed wheel driving shaft 13 with the speed reducing unit 23, this driving connection consisting of a universal joint 25 and telescopic inner and outer shaft members 26, 27 respectively, drivingly associated with the universal joint and with the shaft 13.

The circular rip saw blade 6 is adapted to be rotated at high speed and in the direction indicated by the arrow in Fig. 1, by means of a belt drive 28, and this saw projects upwardly through a slot 29 in the table 7 into the cutting zone. The table 7 is vertically adjustable so as to expose more or less of the blade 6 to the work, by means of relatively standard adjusting mechanism 30, and the elongated work guide 8 may be moved over the table top and along the guide rods 9, 10 and locked into any desired position of adjustment with the aid of a locking lever 31 and cam coacting with the rod 9, and clamping means 32 coacting with the rod 10. The main frame 5, saw blade 6, table 7, guide 8, and the adjusting mechanisms for these elements, are all of old and well known construction, and may vary slightly in design and construction.

The peripherally toothed feed wheels 11, 12 are disposed in a common plane parallel to that of the saw blade 6 and located between the saw blade and the work guide 8, and these feed wheels are rotatable in the direction indicated by the arrows in Fig. 1. The supply feed wheel 11 is disposed on the inlet side of the saw blade 6, while the discharge feed wheel 12 is on the delivery side of the cutting zone, and the two floating feed wheels 11, 12 are independently movable along their respective guideways 17 toward and away from the upper work supporting surface of the table 7. Both feed wheels 11, 12 are however constantly and resiliently urged toward the table by means of the compression springs 16 which are disposed between the parallel uprights of the guideway 17 and coact with the bearing blocks 15, and the tension of each of these springs 16 is independently adjustable by means of a threaded rod 33 coacting with a tubular support 34 mounted upon the adjacent guideways 17. The guideways 17 may either be formed integral with or adjustably secured to the guide 8, and an elongated guard plate 35 may be secured to the tubular supports 34 over the feed wheels 11, 12. For additional safety, another and wider guard plate 36 may be provided beneath the guard plate 35 and directly above the saw blade 6, and this lower guard plate 36 may be adjustably secured to the elongated work guide 8 by means of adjusting screws 37. The chain drive comprising the sprockets 18, 19 and the chain 20, provides a positive motion transmitting mechanism for transferring rotary motion from the supply feed wheel driving shaft 13 to the discharge feed wheel drive shaft 14, without interfering with the independent vertical floating movement of the feed wheels 11, 12 toward and away from the table 7.

While the electric motor 21, speed reducer 23, and belt drive 24 are of standard construction, the positive universally movable driving connection which is interposed between the feed wheel shaft 13 and the reducer 23, must be formed to permit free floating or vertical movement of the supply feed wheel 11. This motion transmitting connection is therefore provided with a universal joint 25 disposed between the telescopic inner member 26 and the speed reducer 23, and the inner telescopic member 26 is slidable longitudinally within the outer tubular member 27 but is drivingly connected thereto by means of a spline 38, see Fig. 4. The telescopic shaft member 27 may be rigidly attached to the hub 39 of the sprocket 18, and this hub may be drivingly connected directly to the feed wheel shaft 13 in any suitable manner which will permit slight rocking motion between these elements, so that the vertical floating motion of the supply feed wheel 11 will not be interfered with. This up and down movement of the feed wheels 11, 12 is not very pronounced since the successive pieces of work are ordinarily approximately the same height or thickness, but may vary fractions of an inch. The telescopic connection afforded by the shaft members 26, 27 is provided primarily for the purpose of permitting the work guide 8 to be moved toward and away from the saw blade 6, without interrupting the driving connection between the speed reducer 23 and the feed wheels 11, 12; and the universal joint 25 is the primary element which permits free floating movement of the supply feed wheel 11, while the flexible driving chain 20 permits free floating motion of the other feed wheel 12 independently of the wheel 11. The improved feed mechanism and the driving mechanism therefore, may be applied to various types of saw assemblages without impairing the efficiency thereof.

During normal operation of the improved saw and automatic feed assembly, it is ordinarily desirable to cut a large number of elongated pieces or wood blocks to the same cross sectional dimensions, and these pieces of work must be fed past the saw in rapid succession. The course of the work pieces or blocks is indicated by the arrow 40 in Fig. 1, and in order to cut the pieces to the correct dimensions, it is first necessary to set the elongated guide 8 the desired distance from the saw blade 6, and this may be accomplished by releasing the lever 31 and the mechanism 32 during the adjusting operation. The telescopic connection afforded by the shaft members 26, 27 will permit the guide 8 to be adjusted toward or away from the saw blade 6 and along the guide rods 9, 10, to any desired position, after which the locking lever 31 and the locking mechanism 32 may be manipulated so as to positively lock the guide 8 in the adjusted position.

After such adjustment has been made and the table 7 has been raised or lowered a distance sufficient to permit the saw blade 6 to properly cooperate with the work, the successive elongated work pieces may be fed by hand toward the supply feed wheel 11 and along the guide 8. As soon as the feed wheel 11 encounters a piece of work, it is no longer necessary to urge the same toward the zone of cutting, since the supply feed wheel will then advance the piece of work longitudinally past the saw blade 6. When the piece of work has reached the discharge feed wheel 12, this wheel encounters the top of the work and quickly advances the cut piece along the guide 8 and away from the table 7. The operator may thus feed successive pieces of work in rapid succession and in end contact with each other, along the guide 8, and when the successive pieces have once engaged the supply feed wheel 11, they are automatically and positively fed past the saw blade 6 and away from the cutting zone, without necessitating further handling thereof. By virtue of the floating suspension of the feed wheels 11, 12, these feed wheels will automatically assume a position corresponding to the height of each piece of work measured vertically from the table 7, and the feed wheels will effectively perform their function regardless of variations in height of the successive work pieces. Due to the independent floating action of the two feed wheels 11, 12, either of these feed wheels may assume a higher or a lower position independently of the other, and the universal joint 25 assures proper driving of the feed wheels at all times. The height of the table may also be varied without in any manner affecting the positions of the feed wheels, and the motor 21 and speed reducer 23 afford a positive driving connection for both feed wheels at all times.

From the foregoing detailed description of the construction and operation of the improved saw and feed mechanism, it will be apparent that our invention provides an improved assemblage for positively and safely transporting a succession of pieces of work past a saw, in a most expeditious manner. The upper guard 35 of the improved assemblage prevents possible damage or injury by virtue of accidental contact with the feed wheels 11, 12 and the lower guard 36 effectively protects the operator against possible injury due to contact with the rapidly revolving saw blade 6. The improved driving connection between the speed reducer 23 and the sprocket 18, not only permits the guide 8 to be set at any desired position, but also co-operates with the motion transmitting chain 20 so as to permit the feed wheels 11, 12 to assume various vertical positions independently of each other. The compression springs 16 constantly urge the feed wheels 11, 12 toward the upper surface of the table 7, and thereby insure proper coaction between the feed wheels and the work regardless of the height of the work pieces. The entire feed assemblage may be readily applied as a unit to various types of saws, at relatively moderate cost, and the improved feed mechanism has proven highly satisfactory in actual use especially for the purpose of cutting pieces of similar size in rapid succession.

It should be understood that it is not desired to limit this invention to the exact details of construction or to the precise mode of use, herein shown and described, for various modifications within the scope of the claims may occur to persons skilled in the art.

We claim:

1. In combination, a saw, a work supporting table for said saw, an elongated guide carried by said table and being adjustable toward and away from said saw, work engaging feed wheels carried by said guide forwardly and rearwardly of the cutting zone, said feed wheels being independently movable toward and away from said table and being simultaneously adjustable with said guide toward and away from the plane of cutting, flexible means for transmitting rotary motion from one of said wheels to the other while permitting free independent movement of each wheel relative to said table, a fixed motor for driving said feed wheels carried by said table, and a single telescopic connection for positively transmitting rotary motion from said motor to one of said feed wheels and for permitting bodily movement of said wheels toward and away from said saw.

2. In combination, a saw, a work supporting table for said saw, a work positioning guide carried by said table and being adjustable toward and away from the plane of cutting of said saw, work engaging supply and discharge feed wheels suspended from said guide forwardly and rearwardly of the cutting zone, said feed wheels being independently movable toward and away from said table and being simultaneously adjustable with said guide toward and away from said plane of cutting, a stationary motor carried by said table, and a positive drive between said motor and one of said feed wheels for permitting movement of said wheels toward and away from said table and said plane.

3. In combination, a saw, a work supporting table for said saw, a work positioning guide carried by said table and being adjustable toward and away from the plane of cutting of said saw, work engaging supply and discharge feed wheels suspended from said guide forwardly and rearwardly of the cutting zone, said feed wheels being independently movable toward and away from said table and being simultaneously movable with said guide toward and away from said plane of cutting, a motor fixedly mounted on said table, and a positive driving connection between said motor and the supply feed wheel formed to permit movement of said wheel toward and away from both said table and said plane.

4. In combination, a saw, a work supporting table for said saw, a work positioning guide carried by said table and being adjustable toward and away from the plane of cutting of said saw, work engaging supply and discharge feed wheels suspended from said guide forwardly and rearwardly of the cutting zone, said feed wheels being independently movable toward and away from said table and being simultaneously adjustable with said guide toward and away from said plane of cutting, a flexible positive motion transmitting chain interposed between said wheels, and stationary means carried by said table for imparting motion to said wheels.

5. In combination, a saw, a work supporting table for said saw, a work positioning guide carried by said table and being adjustable toward and away from the plane of cutting of said saw, work engaging supply and discharge feed wheels suspended from said guide forwardly and rearwardly of the cutting zone, said guides being independently movable toward and away from said table and being simultaneously movable with said guide toward and away from said plane of cutting, a flexible positive chain drive for transmitting rotary motion from said supply to said discharge feed wheels, a motor fixedly mounted on said table, and a positive driving connection between said motor and the supply feed wheel formed to permit movement of said wheel toward and away from both said table and said plane.

6. In combination, a saw, a work supporting table for said saw, an elongated work positioning guide disposed parallel to the plane of cutting of said saw, work engaging supply and discharge feed wheels rotatably suspended from said guide forwardly and rearwardly of the cutting zone and being independently movable toward and away from said table, means for effecting simultaneous lateral adjustment of said guide and said feed wheels toward and away from said plane of cutting, and a telescopic driving connection for one of said feed wheels.

7. In combination, a saw, a work supporting table for said saw, an elongated work positioning guide disposed parallel to the plane of cutting of said saw, work engaging supply and discharge feed wheels rotatably suspended from said guide forwardly and rearwardly of the cutting zone and being independently movable toward and away from said table, means for effecting simultaneous lateral adjustment of said guide and said feed wheels toward and away from said plane of cutting, a flexible positive motion transmitting drive connecting said feed wheels, and a telescopic driving connection for one of said feed wheels.

8. In combination, a saw, a work supporting table for said saw, an elongated work positioning guide disposed on said table parallel to the plane of cutting of said saw and having parallel upright guideways thereon, a work engaging feed wheel journalled in each of said guideways and being movable along its guideway toward and away from said table, means for effecting adjustment of said guide toward and away from said plane of cutting to simultaneously laterally adjust said feed wheels like distances, and a telescopic driving connection for one of said feed wheels formed to compensate for said adjustment.

9. In combination, a saw, a work supporting table for said saw, an elongated work positioning guide disposed on said table parallel to the plane of cutting of said saw and having parallel upright guideways thereon, a work engaging feed wheel journalled in each of said guideways and being movable along its guideway toward and away from said table, means for effecting adjustment of said guide toward and away from said plane of cutting to simultaneously laterally adjust said feed wheels like distances, a positive chain drive connecting said feed wheels while permitting independent movement thereof along said guideways, and a telescopic driving connection for one of said feed wheels formed to compensate for said adjustment.

10. In combination, a circular saw, a work supporting table having a slot through which said saw projects, an elongated work positioning guide disposed on said table parallel to the plane of cutting of said saw, parallel upright guideways formed integral with said guide forwardly and rearwardly of the cutting zone, a work engaging feed wheel journalled in each of said guideways and being movable therealong toward and away from said table, resilient means for constantly urging each of said feed wheels along its guideway toward said table, means for positively transmitting rotary motion from one of said feed wheels to the other while permitting independent movement thereof along said guideways, means for effecting adjustment of said guide toward and away from said plane of cutting to simultaneously laterally adjust said feed wheels like distances, and a driving connection for one of said feed wheels formed to compensate for said adjustment.

D. H. BOSTWICK.
THEO. BODE.